US012649513B2

(12) United States Patent
Ko et al.

(10) Patent No.: US 12,649,513 B2
(45) Date of Patent: Jun. 9, 2026

(54) VEHICLE STEERING APPARATUS

(71) Applicant: HL MANDO CORPORATION, Gyeonggi-do (KR)

(72) Inventors: Kyung Min Ko, Gyeonggi-do (KR); Sang Hee Ahn, Gyeonggi-do (KR); Jung Sik Park, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 882 days.

(21) Appl. No.: 17/604,973

(22) PCT Filed: May 8, 2020

(86) PCT No.: PCT/KR2020/006121
§ 371 (c)(1),
(2) Date: Jul. 7, 2023

(87) PCT Pub. No.: WO2020/231111
PCT Pub. Date: Nov. 19, 2020

(65) Prior Publication Data
US 2024/0034392 A1     Feb. 1, 2024

(30) Foreign Application Priority Data

May 14, 2019     (KR) ........................ 10-2019-0055993

(51) Int. Cl.
B62D 5/04          (2006.01)
B62D 3/10          (2006.01)
(Continued)

(52) U.S. Cl.
CPC ............. B62D 5/0421 (2013.01); B62D 3/10 (2013.01); B62D 5/0409 (2013.01);
(Continued)

(58) Field of Classification Search
CPC ...... B62D 5/0421; B62D 5/0424; B62D 3/10; B62D 5/0445; B62D 5/0454; B62D 5/0409; B62D 5/0484; F16H 1/16; F16H 25/22
See application file for complete search history.

(56) References Cited

U.S. PATENT DOCUMENTS 1,787,342 A * 12/1930 Flowers ................... B60P 1/10
                                                      74/89.35
2,181,425 A * 11/1939 Delaval-Crow ....... B62M 17/00
                                                      74/417
(Continued)

FOREIGN PATENT DOCUMENTS

CN          101806344        8/2010
CN          102689649        9/2012
(Continued)

OTHER PUBLICATIONS

Notice of Allowance dated Apr. 16, 2024 for Chinese Patent Application No. 202080035323.8 and its English translation provided by Global Dossier.
(Continued)

*Primary Examiner* — Timothy Wilhelm
(74) *Attorney, Agent, or Firm* — WOMBLE BOND DICKINSON (US) LLP

(57)          ABSTRACT
According to embodiments of the present invention, engine power consumption can be prevented, the number of components can be reduced, vehicle control functions such as automatic parking, lane keeping, driving assistance according to road surface conditions, steering vibration reduction, and autonomous driving control can be used and thus a driver's convenience can be increased, and stability can be enhanced by providing two motor-reducer structures.

16 Claims, 12 Drawing Sheets

(51) Int. Cl.
  *F16H 1/16*         (2006.01)
  *F16H 25/22*        (2006.01)
(52) U.S. Cl.
  CPC ......... *B62D 5/0445* (2013.01); *B62D 5/0454*
        (2013.01); *B62D 5/0484* (2013.01); *F16H*
        *25/22* (2013.01); *B62D 5/0424* (2013.01);
        *F16H 1/16* (2013.01)

(56)                References Cited

U.S. PATENT DOCUMENTS

| | | | | | |
|---|---|---|---|---|---|
| 2,183,667 | A | * | 12/1939 | Buckendale | B60K 17/04 |
| | | | | | 74/420 |
| RE23,550 | E | * | 9/1952 | Staude | B62D 5/043 |
| | | | | | 74/388 R |
| 3,772,962 | A | * | 11/1973 | Suzuki | B62D 5/24 |
| | | | | | 91/359 |
| 3,968,705 | A | * | 7/1976 | Amano | F16H 35/10 |
| | | | | | 408/11 |
| 4,004,830 | A | * | 1/1977 | Belke | B60S 9/08 |
| | | | | | 280/763.1 |
| RE30,487 | E | * | 1/1981 | Belke | B60S 9/08 |
| | | | | | 280/763.1 |
| 4,318,304 | A | * | 3/1982 | Lang | F16H 25/2021 |
| | | | | | 74/412 TA |
| 4,376,401 | A | * | 3/1983 | Borzym | B23D 25/04 |
| | | | | | 83/628 |
| 4,593,781 | A | * | 6/1986 | Galtier | B62D 5/0448 |
| | | | | | 180/444 |
| 4,694,925 | A | * | 9/1987 | Roberts | B62D 5/0427 |
| | | | | | 180/444 |
| 4,899,622 | A | * | 2/1990 | Kobayashi | B60K 17/08 |
| | | | | | 74/400 |
| 5,029,659 | A | * | 7/1991 | Saito | B62D 5/0412 |
| | | | | | 180/443 |
| 5,165,495 | A | * | 11/1992 | Fujii | B62D 5/0409 |
| | | | | | 180/444 |
| 5,240,445 | A | * | 8/1993 | Aoki | B63H 25/16 |
| | | | | | 440/58 |
| 5,267,625 | A | * | 12/1993 | Shimizu | B62D 5/0421 |
| | | | | | 180/443 |
| 5,299,649 | A | | 4/1994 | Sano et al. | |
| 5,445,237 | A | * | 8/1995 | Eda | B62D 5/0409 |
| | | | | | 180/444 |
| 5,531,408 | A | * | 7/1996 | Wechselberger | B61L 5/02 |
| | | | | | 246/291 |
| 5,819,871 | A | * | 10/1998 | Takaoka | B62D 5/043 |
| | | | | | 192/37 |
| 5,916,325 | A | * | 6/1999 | Madrid | F16D 7/10 |
| | | | | | 464/37 |
| 5,971,094 | A | * | 10/1999 | Joshita | B62D 5/043 |
| | | | | | 403/372 |
| 6,155,376 | A | * | 12/2000 | Cheng | B62D 5/0421 |
| | | | | | 180/444 |
| 6,547,029 | B2 | * | 4/2003 | Peppler | B62D 5/092 |
| | | | | | 180/443 |
| 6,629,578 | B2 | * | 10/2003 | Saruwatari | F16H 55/20 |
| | | | | | 180/444 |
| 6,691,819 | B2 | * | 2/2004 | Menjak | B62D 6/003 |
| | | | | | 701/41 |
| 6,817,437 | B2 | * | 11/2004 | Magnus | B62D 5/006 |
| | | | | | 180/443 |
| 6,848,534 | B2 | * | 2/2005 | Toyofuku | H02K 7/06 |
| | | | | | 180/443 |
| 6,854,556 | B1 | * | 2/2005 | Yamamoto | F16D 1/0835 |
| | | | | | 180/443 |
| 6,889,795 | B2 | * | 5/2005 | Shibata | B62D 5/0421 |
| | | | | | 180/444 |
| 7,159,690 | B2 | * | 1/2007 | Murakami | B62D 5/0448 |
| | | | | | 180/444 |
| 7,172,051 | B2 | * | 2/2007 | Nagamatsu | B62D 5/0448 |
| | | | | | 180/443 |

| | | | | | |
|---|---|---|---|---|---|
| 7,175,558 | B2 | * | 2/2007 | Puiu | F16D 28/00 |
| | | | | | 475/225 |
| 7,290,638 | B2 | * | 11/2007 | Shiino | B62D 5/046 |
| | | | | | 180/444 |
| 7,303,045 | B2 | * | 12/2007 | Yamamori | B62D 5/0409 |
| | | | | | 180/444 |
| 7,604,085 | B2 | * | 10/2009 | Osuka | B62D 5/0403 |
| | | | | | 180/428 |
| 7,610,828 | B2 | * | 11/2009 | Wingett | B64C 13/505 |
| | | | | | 244/99.2 |
| 8,066,091 | B2 | * | 11/2011 | Ito | B62D 5/30 |
| | | | | | 180/406 |
| 8,104,567 | B2 | * | 1/2012 | Murakami | B62D 5/0421 |
| | | | | | 180/443 |
| 8,360,197 | B2 | * | 1/2013 | Escobedo | B62D 5/0454 |
| | | | | | 180/407 |
| 8,397,859 | B2 | * | 3/2013 | Asakura | B62D 5/0448 |
| | | | | | 180/444 |
| 8,567,554 | B2 | * | 10/2013 | Zaloga | B62D 5/0421 |
| | | | | | 180/446 |
| 9,108,666 | B2 | * | 8/2015 | Pesch | B62D 5/0409 |
| 9,347,535 | B1 | * | 5/2016 | Sheahan, Jr. | F16D 11/16 |
| 9,382,972 | B2 | * | 7/2016 | Kwon | F16H 1/26 |
| 9,897,148 | B2 | * | 2/2018 | Hong | B62D 5/0409 |
| 9,988,073 | B2 | * | 6/2018 | Shiina | F16D 11/00 |
| 10,119,609 | B2 | * | 11/2018 | Takahashi | F16H 1/14 |
| 10,279,836 | B2 | * | 5/2019 | Shiina | B62D 5/0454 |
| 10,421,481 | B2 | * | 9/2019 | Wilske | B62D 5/0445 |
| 10,647,346 | B2 | * | 5/2020 | Cai | B62D 5/001 |
| 10,793,183 | B2 | * | 10/2020 | Harter, Jr. | B62D 3/14 |
| 11,027,774 | B2 | * | 6/2021 | Yoda | B62D 5/0481 |
| 11,149,829 | B2 | * | 10/2021 | Matsuto | H02K 7/06 |
| 11,345,396 | B2 | * | 5/2022 | Cartwright | B62D 5/0409 |
| 11,440,580 | B2 | * | 9/2022 | Kim | B62D 5/0409 |
| 11,524,717 | B2 | * | 12/2022 | Kim | B62D 5/0421 |
| 12,122,463 | B2 | * | 10/2024 | Ishihara | B62D 5/0406 |
| 12,187,359 | B2 | * | 1/2025 | Park | B62D 5/043 |
| 12,371,095 | B2 | * | 7/2025 | Ko | F16H 1/32 |
| 2003/0047374 | A1 | * | 3/2003 | Peppler | B62D 5/0421 |
| | | | | | 180/443 |
| 2004/0069559 | A1 | * | 4/2004 | Iwasa | B62D 5/0448 |
| | | | | | 180/443 |
| 2012/0111658 | A1 | * | 5/2012 | Hori | B62D 6/008 |
| | | | | | 180/446 |
| 2012/0160594 | A1 | * | 6/2012 | Yoda | B62D 5/065 |
| | | | | | 180/421 |
| 2012/0241244 | A1 | * | 9/2012 | Escobedo | B62D 5/0421 |
| | | | | | 180/444 |
| 2014/0083794 | A1 | * | 3/2014 | Ishii | F16H 1/16 |
| | | | | | 180/444 |
| 2014/0311263 | A1 | * | 10/2014 | Washnock | B62D 3/08 |
| | | | | | 74/89.14 |
| 2014/0345965 | A1 | | 11/2014 | Ura | |
| 2016/0207560 | A1 | | 7/2016 | Muto et al. | |
| 2017/0241541 | A1 | * | 8/2017 | Kwon | B62D 5/0409 |
| 2018/0111643 | A1 | * | 4/2018 | Kim | B62D 5/04 |
| 2018/0244303 | A1 | | 8/2018 | Wilske et al. | |
| 2018/0244305 | A1 | * | 8/2018 | Cai | B62D 5/0421 |
| 2019/0367076 | A1 | * | 12/2019 | Kim | B62D 5/0409 |
| 2021/0261188 | A1 | * | 8/2021 | Ko | B62D 3/08 |
| 2022/0306185 | A1 | * | 9/2022 | Kim | B62D 5/0445 |
| 2023/0085431 | A1 | * | 3/2023 | Ahn | F16H 57/039 |
| | | | | | 180/444 |

FOREIGN PATENT DOCUMENTS

| | | |
|---|---|---|
| CN | 203126941 U | 8/2013 |
| CN | 104024695 A | 9/2014 |
| CN | 104696446 | 6/2015 |
| DE | 10 2015 217 045 | 3/2017 |
| JP | 09-42408 A | 2/1997 |
| JP | 2005-306317 | 11/2005 |
| KR | 10-2000-0018794 | 4/2000 |
| KR | 10-2008-0022425 | 3/2008 |
| KR | 10-2015-0012827 | 2/2015 |
| KR | 10-2018-0124466 A | 11/2018 |

(56)     References Cited

FOREIGN PATENT DOCUMENTS

OTHER PUBLICATIONS

Jing Zhang et al., Reliability Calculation for Steering Screw of Circulating Ball and Nut Steering Gear, Coal Mine Machinery, vol. 27, No. 2, Feb. 2006, 3 pp. total (including Machine English Translation of the Summary provided by Applicant's foreign counsel).

Office Action dated Nov. 23, 2023 for Chinese Patent Application No. 202080035323.8 and its English translation by Google Translate.

International Preliminary Report on Patentability (Chapter I) for PCT/KR2020/006121 mailed on Nov. 16, 2021 and its English translation from WIPO (now published as WO 2020/231111).

International Search Report for PCT/KR2020/006121 mailed on Aug. 7, 2020 (now published as WO 2020/231111) with English translation provided by WIPO.

Written Opinion of the International Searching Authority for PCT/KR2020/006121 mailed on Aug. 7, 2020 (now published as WO 2020/231111) with English translation provided by Google Translate.

Office Action dated Jan. 16, 2026 for German Patent Application No. 11 2020 002 349.4 and its English translation provided by Microsoft Copilot.

Hahne, Axel et al.: "Planetary and Cycloidal Gearboxes in Comparison", Computer & Automation, Apr. 9, 2018, Germany: Pelemedia GmbH, and Its English translation provided by Microsoft Copilot, pp. 1-6.

* cited by examiner

VEHICLE STEERING APPARATUS

TECHNICAL FIELD

The present disclosure relates to steering apparatuses of vehicles and, more specifically, to a vehicle steering apparatus that is capable of: reducing or preventing the consumption of engine power and reducing the number of components employed therein by assisting drivers in steering the vehicle using a motor; enhancing convenience for drivers by using various functions of controlling the vehicle, such as autonomous parking, lane keeping, driving assistance depending on road conditions, steering vibration attenuation, autonomous driving control, and the like; and improving stability by employing two combinations of motors and reducers.

BACKGROUND ART

In general, a steering apparatus of a vehicle is an apparatus for enabling a driver to change a direction in which the vehicle travels by turning a steering wheel. The vehicle steering apparatus is an assist apparatus for assisting the driver to steer the vehicle in a direction in which the driver desires to travel by allowing the center of rotation around which the front wheels of the vehicle rotate to be changed by a desired angle.

In addition, a power assist steering apparatus is an apparatus for enabling a driver to easily change a traveling direction of a vehicle with less effort by assisting the driver to turn the steering wheel of the vehicle through an apparatus for providing steering assist force when the driver operates the steering wheel.

In such a conventional power assist steering apparatus, a tie rod or knuckle can be operated through a link coupled to a pitman arm by rotating a sector shaft coupled to the pitman arm, and thereby, wheels can be steered. In this case, a hydraulic power assist steering apparatus provided thereto causes the sector shaft to be rotated more easily by hydraulic pressure, and thus, assists drivers to turn the steering wheel.

However, such a hydraulic power assist steering apparatus has disadvantages of: consuming engine power while it operates because a hydraulic pump for supplying the hydraulic pressure is connected to the engine of the vehicle; requiring several hydraulic-related components such as the hydraulic pump, a hydraulic line, a reservoir, and the like; and causing contamination as hydraulic oil consumes.

In particular, since no electronic controller is used in the hydraulic power assist steering apparatus, additional disadvantages thereof are that some functions obtainable by using such a controller, such as autonomous parking, lane keeping, driving assistance depending on road conditions, steering vibration attenuation, autonomous driving control, and the like, cannot be used.

DETAILED DESCRIPTION OF THE INVENTION

Technical Problem

To address these issues, embodiments of the present disclosure provide a vehicle steering apparatus capable of: reducing or preventing the consumption of engine power and reducing the number of components employed therein, by assisting drivers in steering the vehicle using a motor; enhancing convenience for drivers by using various functions of controlling the vehicle, such as autonomous parking, lane keeping, driving assistance depending on road conditions, steering vibration attenuation, autonomous driving control, and the like; and improving stability by employing two combinations of motors and reducers.

Objects of the present disclosure are not limited thereto, and other objects may be clearly understood by those skilled in the art from description below.

Technical Solution

According to aspects of the present disclosure, a vehicle steering apparatus is provided that includes a housing in which a ball screw, a ball nut coupled to the ball screw via balls, and a sector shaft engaged with the ball nut are accommodated, a first reducer coupled to an output shaft connected with the ball screw, and a first motor for driving the first reducer. A second reducer connected with the sector shaft is coupled to the housing, and driven by a second motor. The second reducer includes a hollow case coupled with the housing and the second motor, a first gear member coupled to the sector shaft, a second gear member engaged with the first gear member, and a rotation support member coupled to a motor shaft of the second motor and the first gear member.

Effects of the Invention

In vehicle steering apparatuses according to embodiments of the present disclosure, it is possible to reduce or prevent the consumption of engine power and reduce the number of components employed therein, by assisting drivers in steering the vehicle using a motor; enhance convenience for drivers by using various functions of controlling the vehicle, such as autonomous parking, lane keeping, driving assistance depending on road conditions, steering vibration attenuation, autonomous driving control, and the like; and improve stability by employing two combinations of motors and reducers.

BEST MODE FOR CARRYING OUT THE INVENTION

Figure 1:
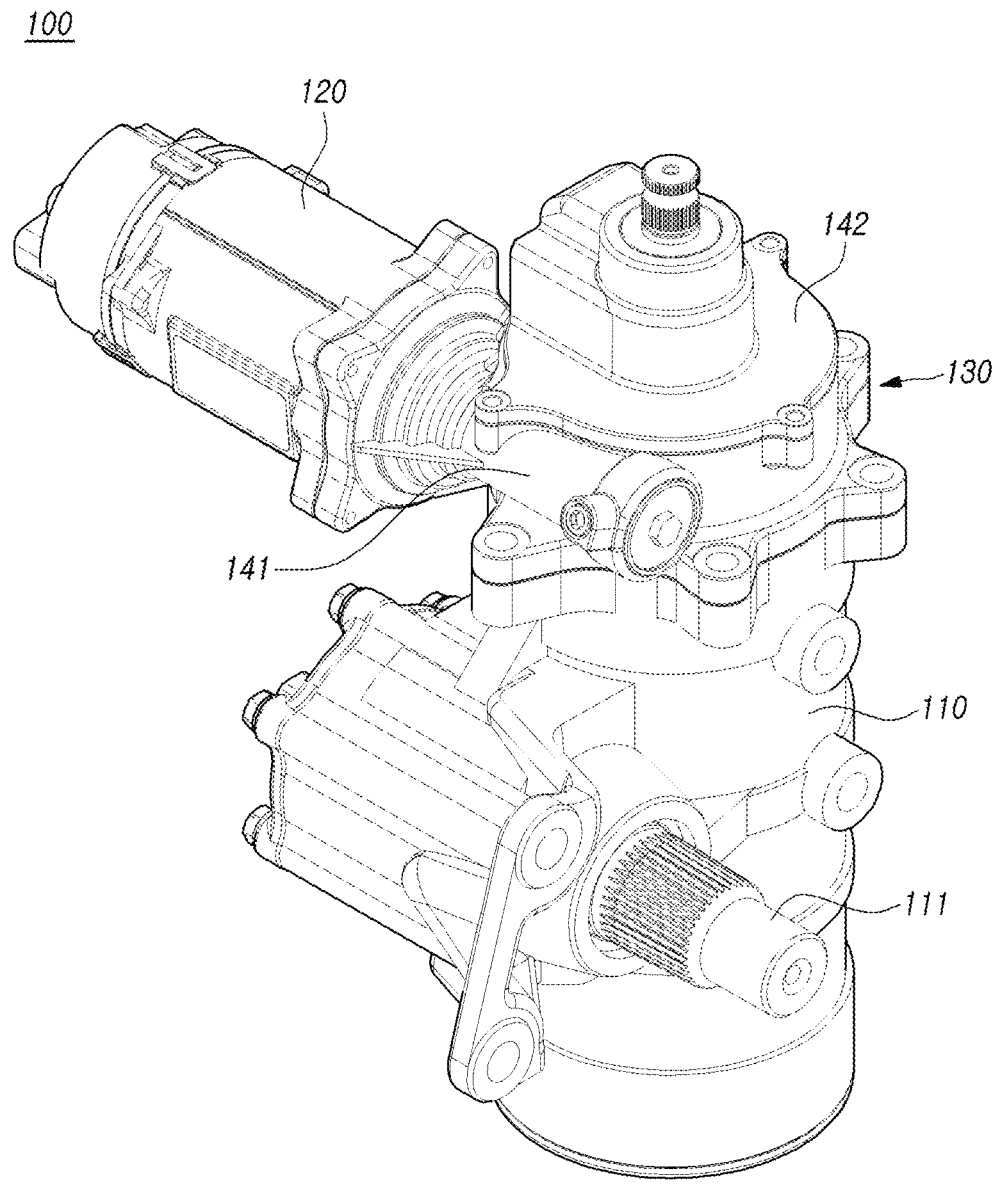
FIG. 1 is a perspective view of a vehicle steering apparatus according to aspects of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that an element is "connected" or "coupled" to another element, it should be interpreted that another element may be "interposed" between the elements or the elements may be "connected" or "coupled" to each other via another element as well as that one element is directly connected or coupled to another element.

Figure 2:
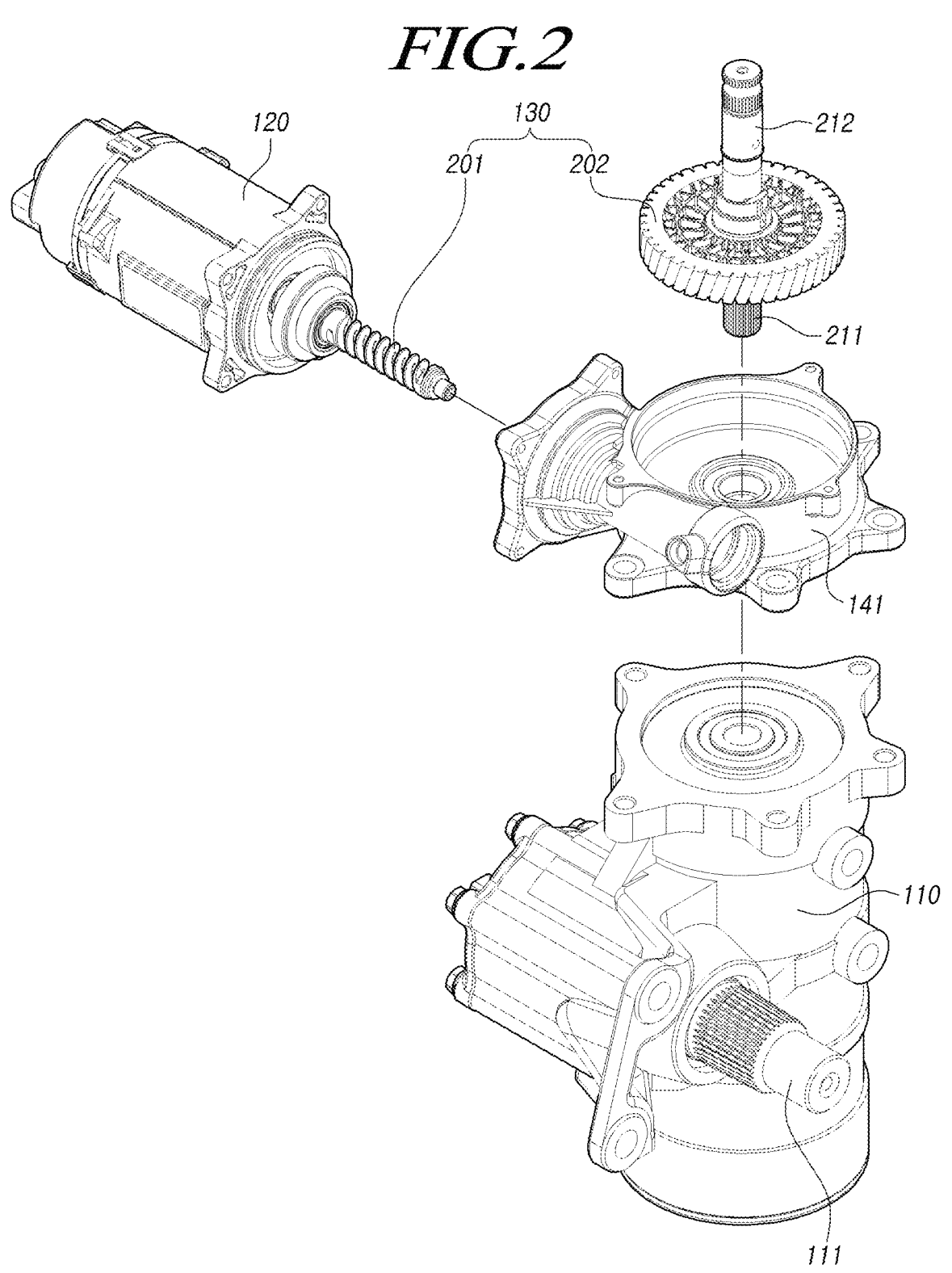
FIG. 2 is an exploded perspective view for a portion of FIG. 1.
Figure 3:
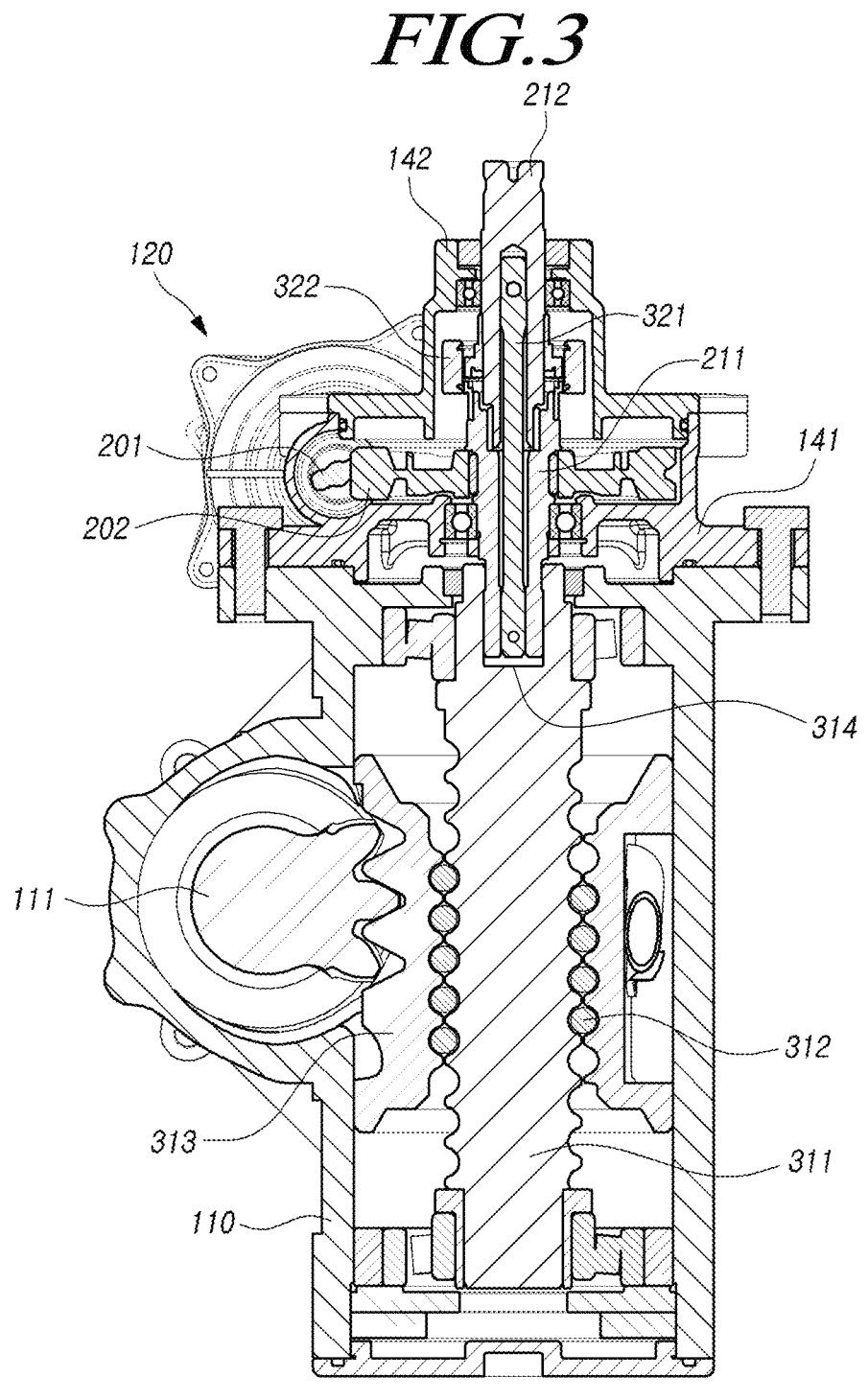
FIG. 3 is a cross-sectional view of the steering apparatus of FIG. 1.
Figure 4:
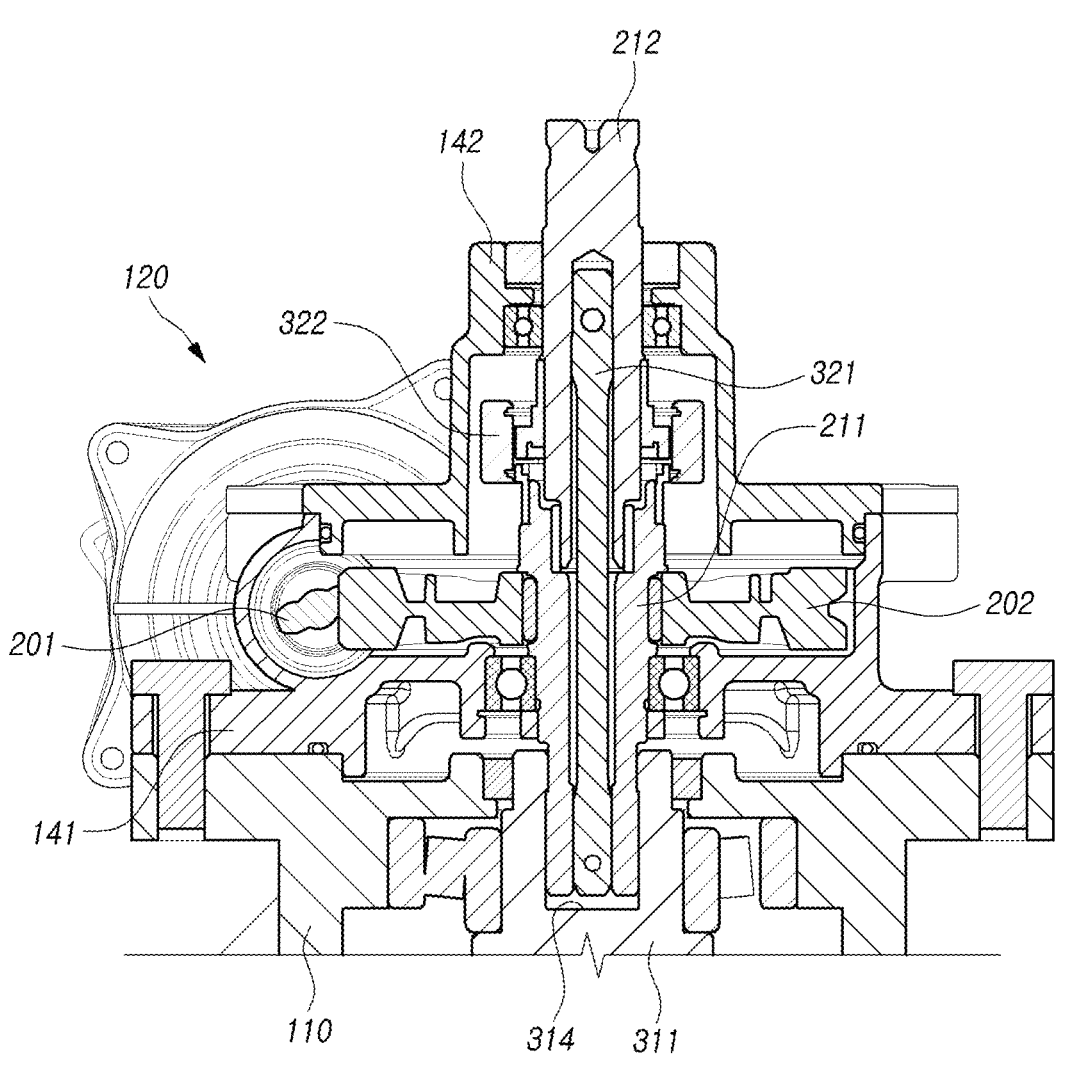
FIG. 4 is an exploded perspective view for a portion of FIG. 3.
Figure 5:
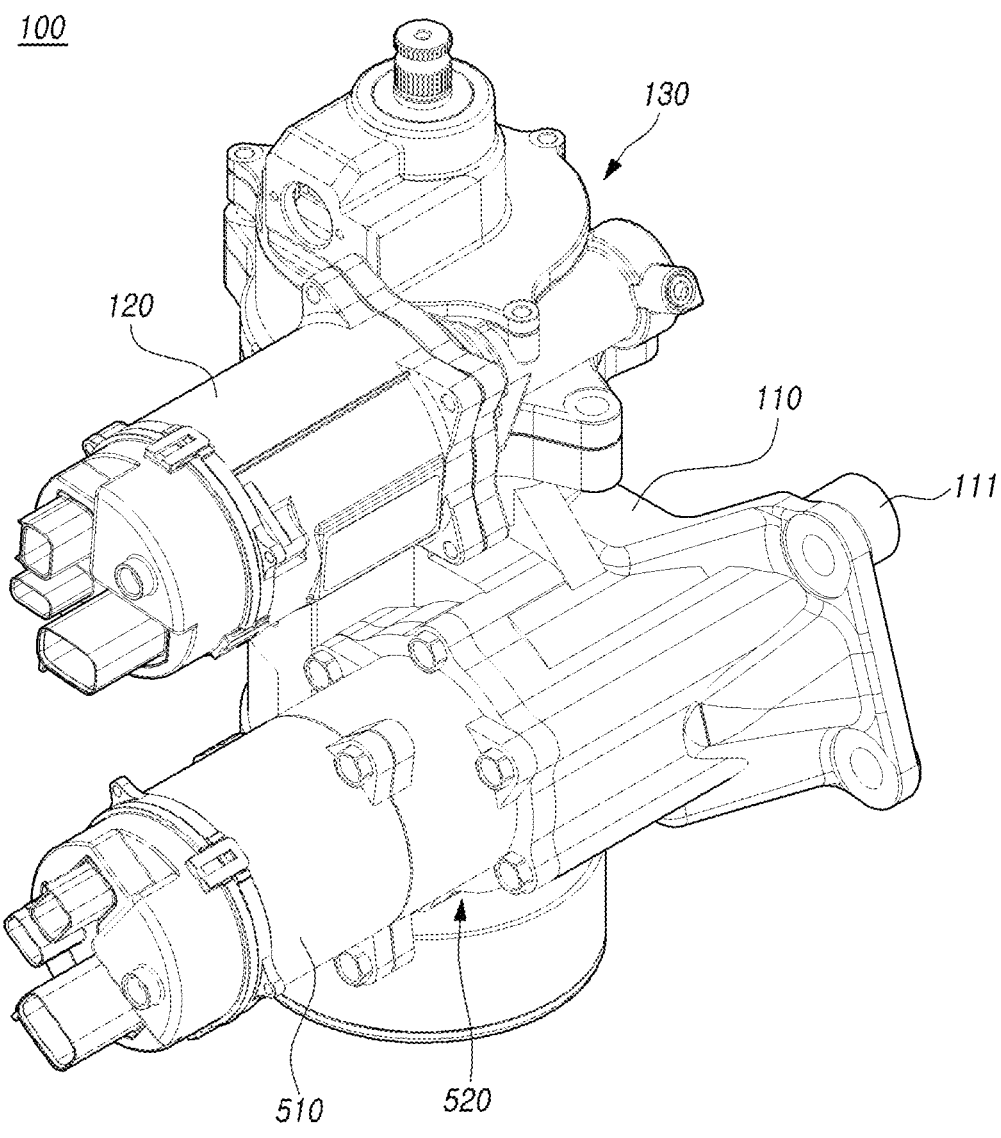
FIG. 5 is a perspective view of a vehicle steering apparatus according to aspects of the present disclosure.
Figure 6:
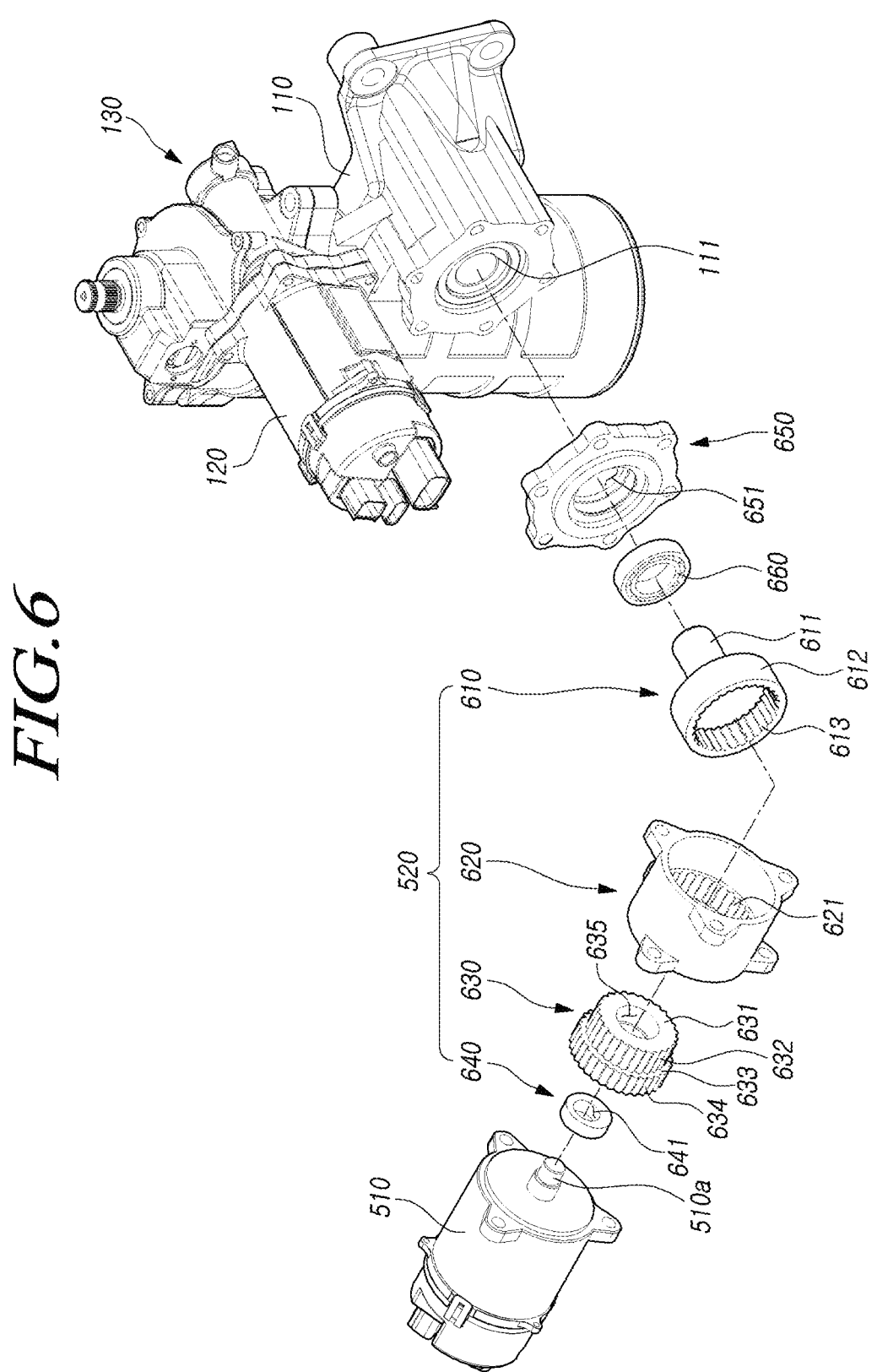
FIG. 6 is an exploded perspective view for a portion of FIG. 5.
Figure 7:
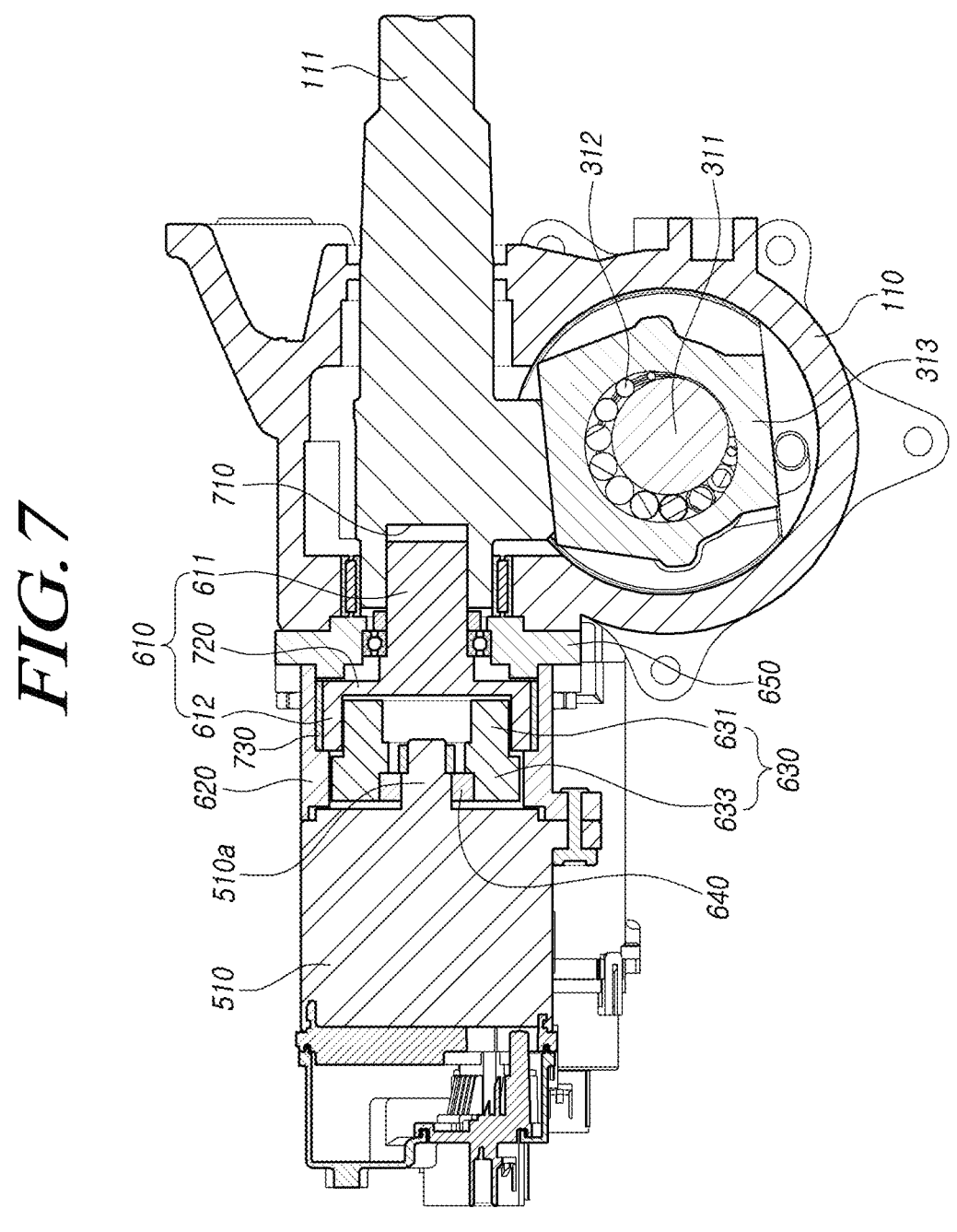
FIG. 7 is a cross-sectional view of the steering apparatus of FIG. 5.
Figure 8:
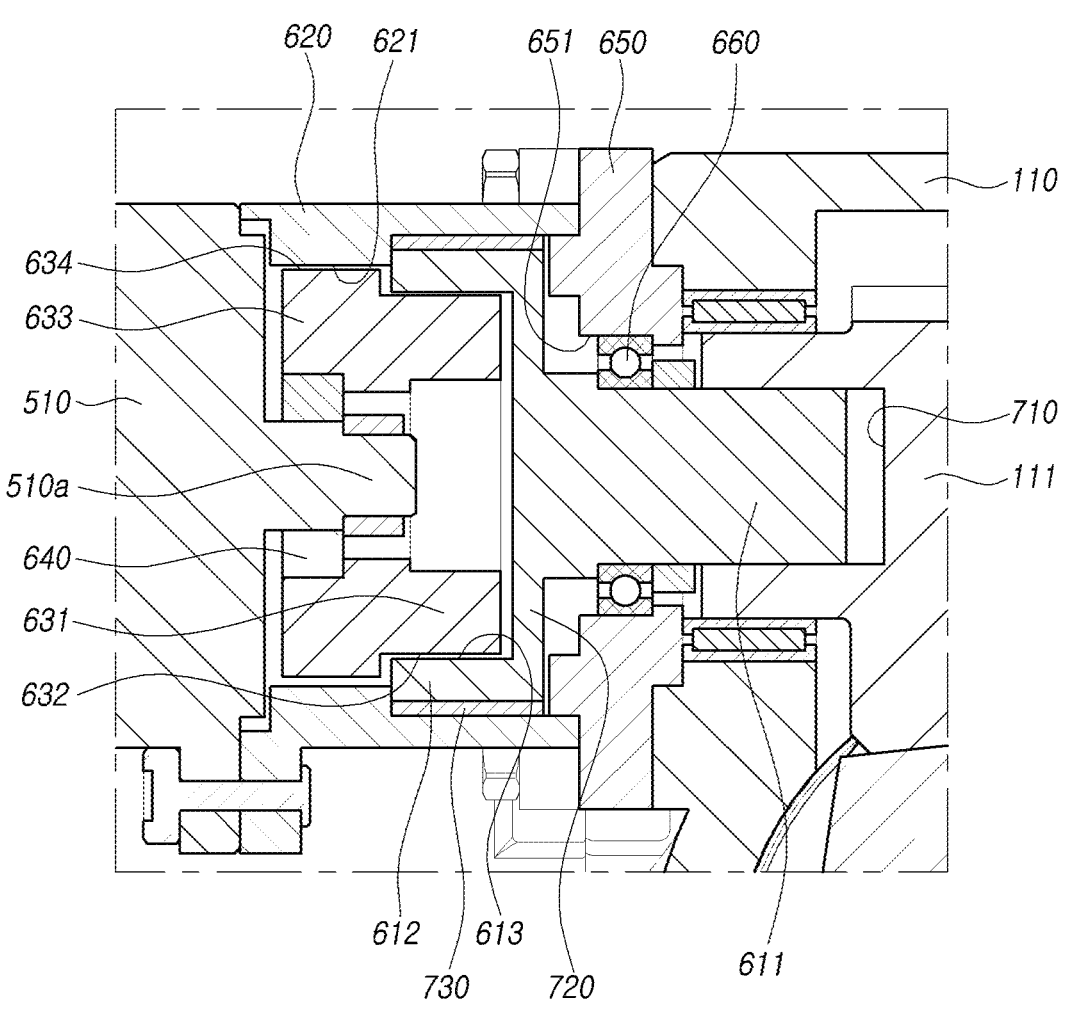
FIG. 8 is an exploded view for a portion of FIG. 7.
Figure 9:
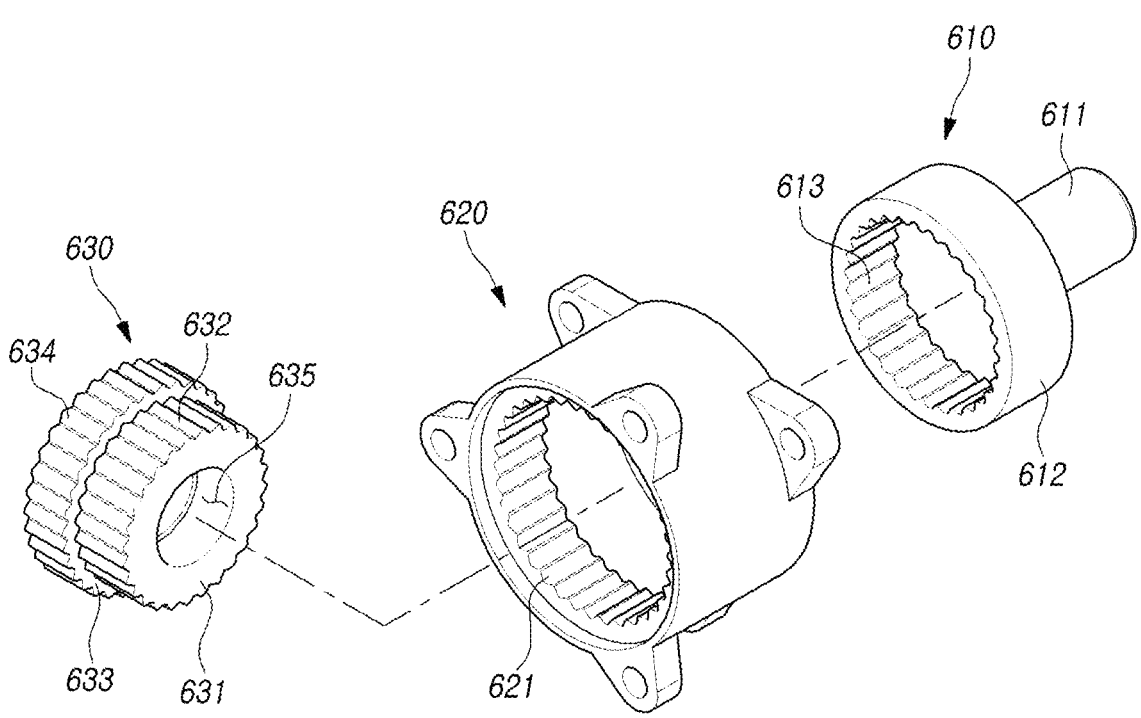
FIGS. 9 and 10 are exploded perspective views for portions of FIG. 5.
Figure 10:
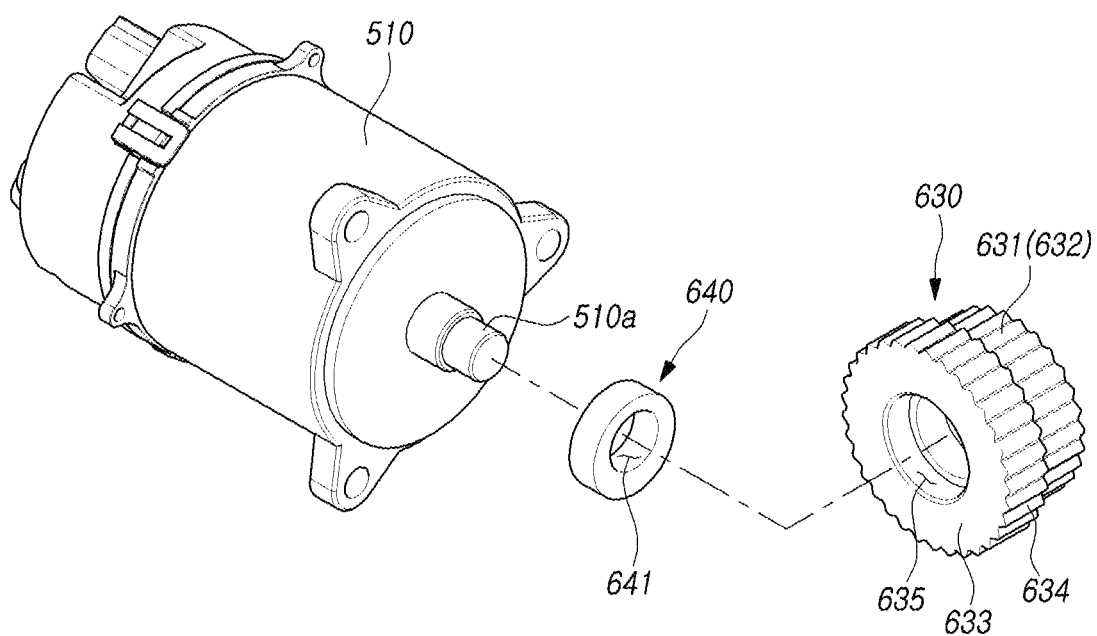
Figure 11:
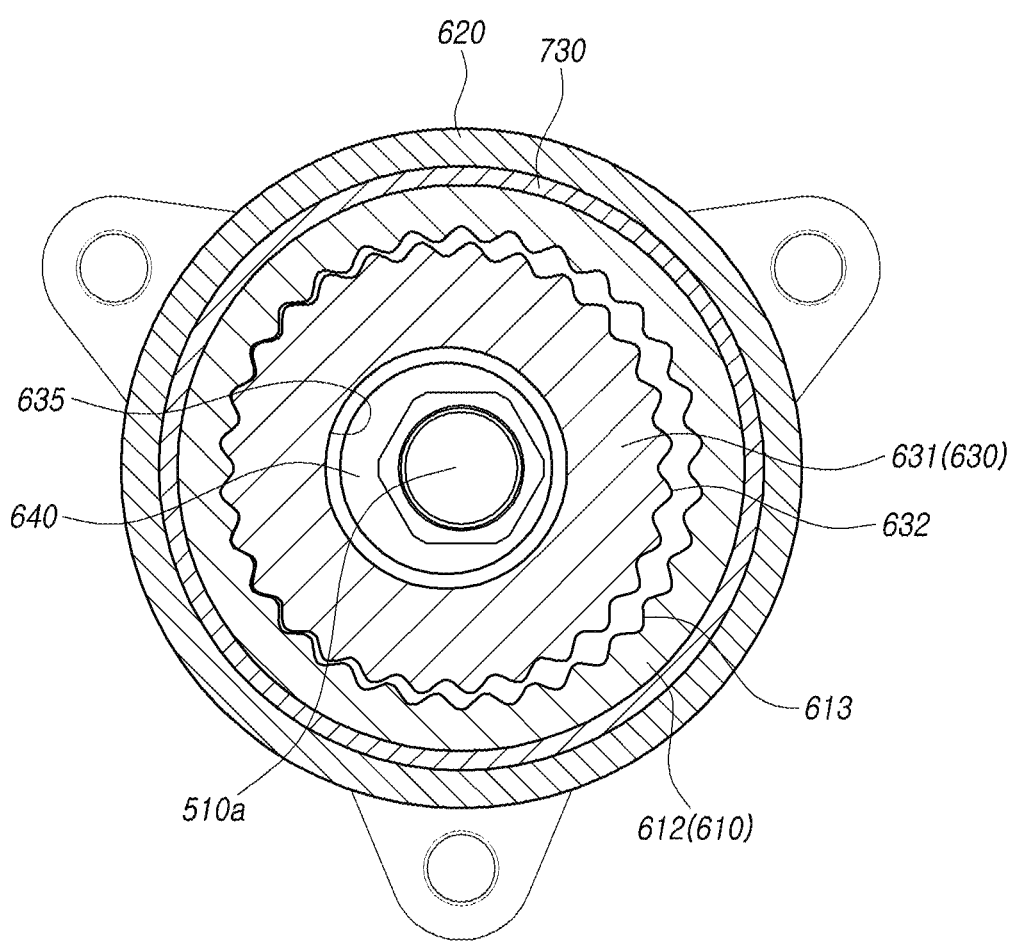
FIGS. 11 and 12 are cross-sectional views of the steering apparatus of FIG. 5.
Figure 12:
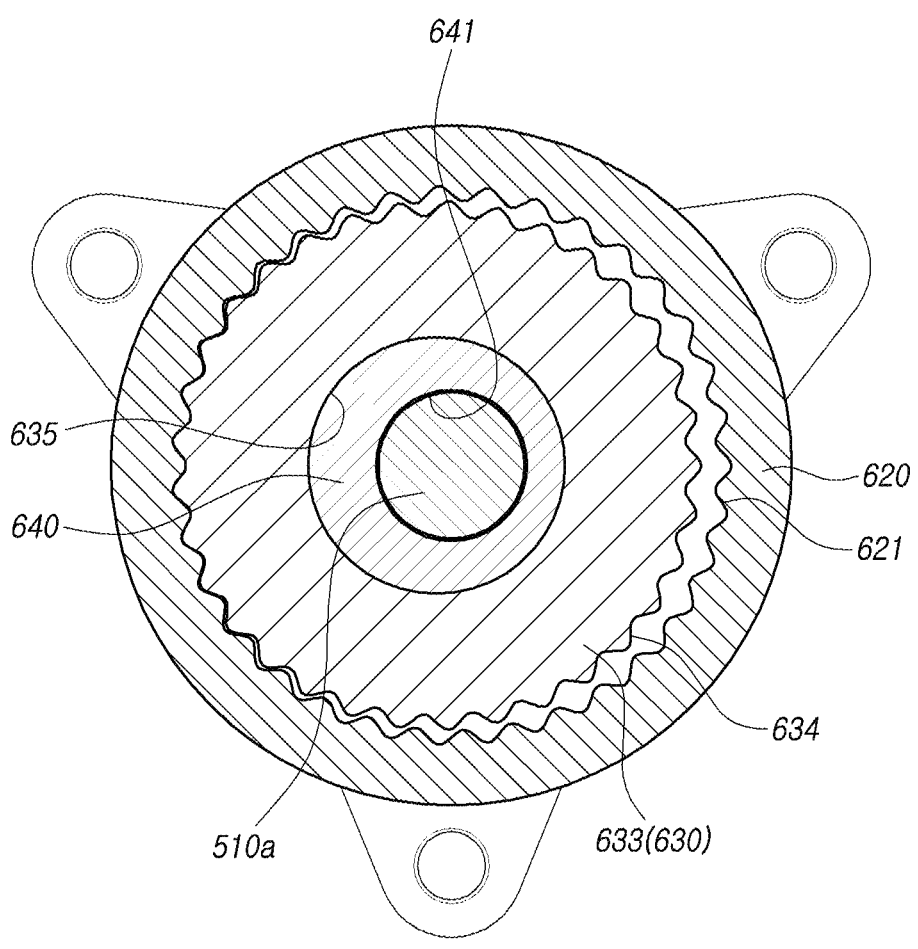

FIG. 1 is a perspective view of a vehicle steering apparatus according to aspects of the present disclosure; FIG. 2 is an exploded perspective view for a portion of FIG. 1; FIG. 3 is a cross-sectional view FIG. 1; FIG. 4 is an exploded perspective view for a portion of FIG. 3; FIG. 5 is a perspective view of a vehicle steering apparatus according to aspects of the present disclosure; FIG. 6 is an exploded perspective view for a portion of FIG. 5; FIG. 7 is a cross-sectional view of FIG. 5; FIG. 8 is an exploded view for a portion of FIG. 7; FIGS. 9 and 10 are exploded perspective views for portions of FIG. 5; and FIGS. 11 and 12 are cross-sectional views of the steering apparatus of FIG. 5.

According to aspects of the present disclosure, a vehicle steering apparatus 100 is provided that includes a housing 110 in which a ball screw 311, a ball nut 313 coupled to the ball screw 311 via balls 312, and a sector shaft 111 engaged with the ball nut 313 are accommodated, a first reducer 130 coupled to an output shaft 211 connected with the ball screw 311, and a first motor 120 for driving the first reducer 130. A second reducer 520 connected with the sector shaft 111 is coupled to the housing 110, and driven by a second motor 510. The second reducer 520 includes a hollow case 620 coupled with the housing 110 and the second motor 510, a first gear member 610 coupled to the sector shaft 111, a second gear member 630 engaged with the first gear member 610, and a rotation support member 640 coupled to a motor shaft 510a of the second motor 510 and the first gear member 610.

Hereinafter, the vehicle steering apparatus 100 according to aspects of the present disclosure is described with reference to FIGS. 1 to 4.

The ball screw 311 may be connected to a steering shaft (not shown) through the output shaft 211, an input shaft 212, and the like, and can be turned by the turning of an associated steering wheel by drivers.

An outer circumferential screw groove may be formed on an outer circumferential surface of the ball screw 311, and an inner circumferential screw groove may be formed on an inner circumferential surface of the ball nut 313. Thereby, the ball screw 311 and the ball nut 313 can be coupled via balls 312 as shown in FIG. 3.

As the ball screw 311 turns, the ball nut 313 can axially slide on the ball screw 311 inside of the housing 110.

Gears meshed with each other may be formed in the ball nut 313 and the sector shaft 111. In this case, as the ball nut 313 slides, the sector shaft 111 can turn, and thereby, a pitman arm (not shown) coupled to the sector shaft 111 can be activated. As a result, wheels can be steered by an associated link.

The first reducer 130 may be provided inside of a first cover 141 coupled to the housing 110, and the first motor 120 may be coupled to the first cover 141 to drive the first reducer 130.

The output shaft 211 may be coupled to the ball screw 311, and the first reducer 130 is coupled to the output shaft 211. The output shaft 211 may be coupled to the first cover 141 via a bearing.

The torque of the first motor 120 can be reduced by the first reducer 130 and transferred to the output shaft 211 and the ball screw 311, thereby, assisting drivers in turning the steering wheel.

The ball screw 311 may have a first depression 314 that is axially depressed, and the output shaft 211 may be inserted in the first depression 314 to be coupled to the ball screw 311.

In one embodiment, the first depression 314 and an end of the output shaft 211 may have serrations, and thereby, be coupled to be supported in the circumferential direction. In another embodiment, the output shaft 211 and the ball screw 311 may be coupled by press fitting.

The output shaft 211 may be coupled to the input shaft 212 connected to the steering shaft via a torsion bar 321. In this case, a torque sensor 322 may be disposed inside of a second cover 142 coupled to the first cover 141, and can detect a steering torque produced by driver's steering wheel turning from a phase difference between the output shaft 211 and the input shaft 212.

The input shaft 212 may be coupled to the second cover 142 via a bearing.

Although not shown in drawings, a controller may be provided in the vehicle. The controller can collect information detected by sensors including the torque sensor 322, and the like, and control the first motor 140 and the second motor 510 that is described below in further detail based on the collected information. Therefore, a variety of functions of controlling the vehicle, such as autonomous parking, lane keeping, driving assistance depending on road conditions, steering vibration attenuation, autonomous driving control, and the like, can be used, leading convenience for drivers to be enhanced.

The first reducer 130 may include a worm wheel 202 coupled to the output shaft 211, and a worm shaft 201 engaged with the worm wheel 202 and coupled to the first motor 120 as shown in FIG. 2.

In such a configuration, as the first motor 120 rotates the worm shaft 201, the worm shaft 201 and the worm wheel 202 becomes engaged or remains in an engaged status, and the torque of the first motor 120 is amplified and transferred to the output shaft 211 and the ball screw 311. Accordingly, driver's steering wheel turning can be assisted.

It should be noted that first reducers 130 according to embodiments of present disclosure are not limited to the above-described embodiments. For example, any first reducers may be employed as long as they can reduce the torque of the first motor 120 and transfer it to the output shaft 211.

Hereinafter, a vehicle steering apparatus 100 according to aspects of the present disclosure is described with reference to FIGS. 5 to 12. Some components of the steering apparatus 100 of FIGS. 5 to 12 may be equal, or substantially equal, to those of the steering apparatus 100 of FIGS. 1 to 4. Such components are labeled with like reference numbers, the details of which may be replaced by the discussions conducted above.

The second reducer 520 connected with the sector shaft 111 may be coupled to the housing 110, and the second reducer 520 can be driven by the second motor 510.

The torque of the second motor 510 can be reduced by the second reducer 520 and transferred to the sector shaft 111, thereby, assisting drivers in turning the steering wheel.

That is, in order to assist drivers in turning the steering wheel, since the first motor 120 transfers torque to the ball screw 311, and the second motor 510 transfers torque to the sector shaft 111, thereby, the size of the motors producing such assisting torques can be reduced. As a result, the steering apparatus 100 having this structure can be advantageous in terms of cost and weight etc., and also assist drivers to turn the steering wheel with greater power.

The second motor 510 can be also controlled by the controller, and perform a function of enhancing driver's convenience together with the first motor 120.

The second reducer 520 may include the hollow case 620 coupled with the housing 110 and the second motor 510, the first gear member 610 coupled to the sector shaft 111, the second gear member 630 engaged with the first gear member 610, and the rotation support member 640 coupled to the motor shaft 510a of the second motor 510 and the first gear member 610 as shown in FIG. 6.

The first gear member 610 may include a coupling portion 611 coupled to the sector shaft 111 inside of the housing 110, and a first gear portion 612 engaged with the second gear member 630 inside of the case 620.

The sector shaft 111 may have a second depression 710 that is axially depressed, and the coupling portion 611 may be inserted in the second depression 710. Thus, the first gear member 610 can be connected with the sector shaft 111 as shown in FIG. 7.

In one embodiment, the coupling portion 611 and the second depression 710 may have serrations, and thereby, be coupled to be supported in the circumferential direction. In another embodiment, the coupling part 611 and the sector shaft 111 may be coupled by press fitting.

A cover member 650 may be provided between the case 620 and the housing 110, and a hollow hole 651 through which the coupling portion 611 is inserted may be formed in the cover member 650.

That is, the first gear member 610, the second gear member 630, and the like are provided inside of the case 620. The second motor 510 may be coupled to one side of the case 620, and the cover member 650 may be coupled to another side thereof. The second motor 510, the second reducer 520, and the cover member 650, which are assembled together, may be inserted in the hollow hole 651, and the coupling portion 611, which protrudes, may be inserted in the second depression 710. Thus, the second motor 510 and the second reducer 520 can be easily connected with the sector shaft 111.

The coupling portion 611 may be coupled to the cover member 650 via a bearing 660, and the bearing 660 may be fixed in the axial direction by a snap ring, a lock nut, or the like.

Meanwhile, a bush member 730 may be provided between the first gear portion 612 and the case 620, and the first gear member 610 may be supported on the inner circumferential surface of the case 620 as shown in FIG. 8.

That is, since the first gear member 610 is supported by the cover member 650 via the bearing 660, and supported by the case 620 via the bush member 730, the first gear member 610 can be smoothly rotated.

Instead of the bush member 730, a bearing or the like may be employed.

The first gear portion 612 may be hollow, and a first gear 613 may be formed on the inner circumferential surface of the first gear portion 612. The second gear member 630 may include a second gear portion 631 inserted in the first gear portion. Here, a second gear 632 engaged with the first gear 613 is formed on the outer circumferential surface of the second gear portion 631.

The first gear portion 612 may be engaged with the second gear portion 631 inside of the case 620, and the first gear portion 612 may have a larger diameter than the coupling portion 611 as shown in drawings.

That is, the first gear member 610 may include a connection portion 720 formed to have an increased diameter at an end of the coupling portion 611, and the first gear portion 612 may be formed to axially extend from the radial edge of the connection portion 720.

The first gear 613 and the second gear 632 may be cycloid gears. That is, the inner diameter of the first gear portion 612 may be greater than the outer diameter of the second gear portion 631, and thus, the number of gear teeth of the first gear 613 may be greater than the number of gear teeth of the second gear 632 as shown in FIG. 11.

A third gear 621 and a fourth gear 634 that are described below in further detail may be also cycloid gears, and as the rotation support member 640 has an eccentric structure and supports the rotation of the second gear member 630, the torque of the second motor 510 can be amplified and transferred to the sector shaft 111.

That is, the third gear 621 may be formed on the inner circumferential surface of the case 620, and the second gear member 630 may include a third gear portion 633. Here, the fourth gear 634 engaged with the third gear 621 may be formed on the outer circumferential surface of the third gear portion 633.

As shown in drawings, the bush member 730 may be supported on the inner circumferential surface of a portion of the case 620 that faces the sector shaft 111, and the third gear may be formed on the inner circumferential surface of a portion of the case 620 that faces the second motor 510. The second gear portion 631 may be located in a portion of the second gear member 630 that faces the sector shaft 111, and the third gear portion 633 may be located in a portion of the second gear member 630 that faces the second motor 510.

As described above, the third gear 621 and the fourth gear 634 may be cycloid gears. That is, the inner diameter of the case 620 may be greater than the outer diameter of the third gear portion 633, and thus, the number of gear teeth of the third gear 621 may be greater than the number of gear teeth of the fourth gear 634 as shown in FIG. 12.

Further, the diameter of the third gear portion 633 may be greater than the diameter of the second gear portion 631. Thus, as the first gear member 610 and the second gear member 630 are turned, the torque of the second motor 510 can be amplified.

The rotation support member 640 may have a coupling hole 641 in which the motor shaft 510a is inserted, and the second gear member 630 may have an insertion hole 635 that is formed to be axially penetrated. Therefore, the second gear member 630 may be supported on the outer circumferential surface of the rotation support member 640 as shown in FIG. 9.

A lock nut supported in the axial direction by the rotation support member 640 coupled to the motor shaft 510a may be coupled to the motor shaft 510a, and the rotation support member 640 may be fixed by the lock nut.

Respective central axes of inner and outer circumferential surfaces of the rotation support member 640 may be different from each other. That is, the rotation support member 640 may have an eccentric structure.

Since the rotation support member 640 has the eccentric structure, the rotational central axis of the second gear member 630 becomes different from the motor shaft 510a. As the second gear 632 and the fourth gear 634 are engaged with the first gear 613 and the third gear 621, respectively, the second gear member 630 can be turned Although not shown in drawings, a bearing may be located between the outer circumferential surface of the rotation support member 640 and the inner circumferential surface of the second gear member 630.

The torque of the second motor 510 is transferred to the sector shaft 111 by the second reducer 520 having the above-described structure, and driver's steering wheel turning can be assisted by the first motor 120 and the second motor 510.

It should be noted that second reducers 520 according to embodiments of present disclosure are not limited to the above-described embodiments. For example, any second reducers may be employed as long as they can transfer the torque of the second motor 510 to the ball screw 311.

Meanwhile, as described above, driver's steering wheel turning can be assisted by the operation of both the first motor 120 and the second motor 510 or the operation of any one of the first motor 120 and the second motor 510.

That is, in a situation where a high assisting torque is required (for example, during low-speed driving), it is possible to lead drives to get relatively light steering feel by assisting steering force through the operation of both the first motor 120 and the second motor 510, and in a situation where a low assisting torque is required (for example, during high-speed driving), it is possible to lead drives to get relatively heavy steering feel by assisting steering force through the operation of any one of the first motor 120 and the second motor 510.

Further, since two combinations of motors and reducers are employed, and only one of the first motor 120 and the second motor 510 can be operated to assist drivers in turning the steering wheel, the stability of steering the vehicle can be therefore improved.

In other words, in a situation where any one of the first motor 120 and the first reducer 130 is not normally operated, the second motor 510 can drive the second reducer 520 to assist steering force, and in a situation where any one of the second motor 510 and the second reducer 520 is not normally operated, the first motor 120 can drive the first reducer 130 to assist the steering force.

Such situations where the first motor 120, the first reducer 130, and the like cannot be normally operated may include not only physical malfunctions such as gear tooth damage, foreign substance jamming, and the like, but also electrical malfunctions in which the control of a controller is not performed normally.

To do this, one or more sensors that can acquire rotation information of the first motor 120 and the second motor 510, and the like can be included in the vehicle, and the controller can determine whether such malfunctions occur based on the information received from the sensors.

The vehicle steering apparatuses according to the embodiments described herein can reduce or prevent the consumption of engine power and reduce the number of components employed therein, by assisting drivers in steering the vehicle using a motor; enhance convenience for drivers by using various functions of controlling the vehicle, such as autonomous parking, lane keeping, driving assistance depending on road conditions, steering vibration attenuation, autonomous driving control, and the like; and improve stability by employing two combinations of motors and reducers.

It should be noted that although all or some of the configurations or elements included in one or more of the embodiments described above have been combined to constitute a single configuration or component or operated in combination, the present disclosure is not necessarily limited thereto. That is, within the scope of the object or spirit of the present disclosure, all or some of the configurations or elements included in the one or more of the embodiments may be combined to constitute one or more configurations or components or operated in such combined configuration(s) or component(s).

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

CROSS-REFERENCE TO RELATED APPLICATIONS

This application is the national stage of International Application No. PCT/KR2020/006121, filed on Aug. 5, 2020, which claims priority from Korean Patent Application No. 10-2019-0055993, filed on May 14, 2019, the disclosures of which are hereby incorporated by reference for all purposes as if fully set forth herein. In addition, if this patent application claims priority for countries other than the United States for the same reason as above, all the contents are incorporated into this patent application by reference.

What is claimed is:

1. A vehicle steering apparatus comprising:
   a housing accommodating a ball screw, a ball nut coupled to the ball screw via balls, and a sector shaft engaged with the ball nut;
   a first reducer coupled to an output shaft connected with the ball screw; and
   a first motor for driving the first reducer, wherein a second reducer connected with the sector shaft is coupled to the housing, and driven by a second motor, and wherein the second reducer comprises:

a hollow case coupled with the housing and the second motor;

a first gear member coupled to the sector shaft;

a second gear member engaged with the first gear member; and a rotation support member coupled to a motor shaft of the second motor and the second gear member, wherein the first gear member comprises a coupling portion coupled to the sector shaft inside of the housing, a cover member is provided between the case and the housing, and the coupling portion is coupled to the cover member via a bearing.

2. The vehicle steering apparatus according to claim 1, wherein the ball screw has a first depression that is axially depressed, and the output shaft is inserted in the first depression.

3. The vehicle steering apparatus according to claim 1, wherein the output shaft is coupled to an input shaft connected with a steering shaft via a torsion bar.

4. The vehicle steering apparatus according to claim 1, wherein the first reducer comprises a worm wheel coupled to the output shaft, and a worm shaft engaged with the worm wheel and coupled to the first motor.

5. The vehicle steering apparatus according to claim 1, wherein and a first gear portion engaged with the second gear member inside of the case.

6. The vehicle steering apparatus according to claim 5, wherein the sector shaft has a second depression that is axially depressed, and the coupling portion is inserted in the second depression.

7. The vehicle steering apparatus according to claim 6, wherein the cover member has a hollow hole through which the coupling portion is inserted.

8. The vehicle steering apparatus according to claim 5, wherein a bush member is provided between the first gear portion and the case.

9. The vehicle steering apparatus according to claim 5, wherein the first gear portion is hollow, and a first gear is formed on an inner circumferential surface of the first gear portion, and wherein the second gear member includes a second gear portion inserted in the first gear portion, and a second gear engaged with the first gear is formed on an outer circumferential surface of the second gear portion.

10. The vehicle steering apparatus according to claim 9, wherein the first gear and the second gear are cycloid gears.

11. The vehicle steering apparatus according to claim 1, wherein in a situation where any one of the first motor and the first reducer is not normally operated, the second motor drives the second reducer to assist steering force, and in a situation where any one of the second motor and the second reducer is not normally operated, the first motor drives the first reducer to assist the steering force.

12. A vehicle steering apparatus comprising:

a housing accommodating a ball screw, a ball nut coupled to the ball screw via balls, and a sector shaft engaged with the ball nut;

a first reducer coupled to an output shaft connected with the ball screw; and a first motor for driving the first reducer, wherein a second reducer connected with the sector shaft is coupled to the housing and driven by a second motor, and wherein the second reducer comprises:

a hollow case coupled with the housing and the second motor;

a first gear member coupled to the sector shaft;

a second gear member engaged with the first gear member; and a rotation support member coupled to a motor shaft of the second motor and the second gear member, wherein a third gear is formed on an inner circumferential surface of the case, and wherein the second gear member comprises a third gear portion, and a fourth gear engaged with the third gear is formed on an outer circumferential surface of the third gear portion.

13. The vehicle steering apparatus according to claim 12, wherein the third gear and the fourth gear are cycloid gears.

14. The vehicle steering apparatus according to claim 12, wherein a diameter of the third gear portion is greater than a diameter of the second gear portion.

15. The vehicle steering apparatus according to claim 12, wherein the rotation support member has a coupling hole in which the motor shaft is inserted, and wherein the second gear member has an insertion hole that is formed to be axially penetrated, and the second gear member is supported on an outer circumferential surface of the rotation support member.

16. The vehicle steering apparatus according to claim 15, wherein respective central axes of inner and outer circumferential surfaces of the rotation support member are different from each other.

* * * * *